United States Patent

Zheng et al.

Patent Number: 6,148,639
Date of Patent: Nov. 21, 2000

[54] SPLICING AN OPTICAL FIBER HAVING TWIN CORES

[75] Inventors: Wenxin Zheng, Solna; Ola Hulten, Bromma, both of Sweden

[73] Assignee: Telefonaktiebolaget LM Ericsson, Stockholm, Sweden

[21] Appl. No.: 08/817,571

[22] PCT Filed: Oct. 24, 1995

[86] PCT No.: PCT/SE95/01262

§ 371 Date: Jul. 9, 1997

§ 102(e) Date: Jul. 9, 1997

[87] PCT Pub. No.: WO96/12980

PCT Pub. Date: May 2, 1996

[30] Foreign Application Priority Data

Oct. 24, 1994 [SE] Sweden .................. 9403642

[51] Int. Cl.[7] .......... C03B 37/07; G01N 21/00; G01N 23/00
[52] U.S. Cl. ................ 65/407; 65/377; 65/378
[58] Field of Search ............ 65/377, 378, 407, 65/484, 485, 501; 385/95, 98

[56] References Cited

U.S. PATENT DOCUMENTS

| 5,638,476 | 6/1997 | Zheng | 385/96 |
| 5,758,000 | 5/1998 | Zheng | 385/97 |

FOREIGN PATENT DOCUMENTS

| 3829118 | 3/1990 | Germany . |
| 469 200 | 2/1992 | Sweden . |
| 500 874 | 8/1994 | Sweden . |
| 95/14945 | 6/1995 | WIPO . |

OTHER PUBLICATIONS

English Abstract of WPI Accession No. 93-043031.

*Primary Examiner*—Stanley S. Silverman
*Assistant Examiner*—Jacqueline A. Ruller
*Attorney, Agent, or Firm*—Burns, Doane, Swecker & Mathis, L.L.P.

[57] ABSTRACT

In joining an optical fiber containing twin cores to a corresponding optical fiber of standard type having a single core and having the same outer diameter, so that a core in the twin-core fiber is aligned with the core in the standard fiber, a conventional automatic splicing machine for optical fibers is used. The twin-core fiber is placed with its cores for instance located in a vertical plane. Then the fibers are spliced in a conventional manner with an alignment of the outer surfaces of the fiber ends and during the splicing procedure or from the finished splice the lateral offset of for instance the upper core of the twin-core fiber and the single core is determined. This can be carried out by capturing an image of the fiber splice in a heated state, when the splice is performed by fusion-welding. The determined offset value then gives the offset, which is to exist between the outer surfaces of the fiber ends for providing the correct alignment of the fiber cores. Hence, the splice region of the fibers is then removed and the fibers are spliced again, but this time with a suitable, calculated offset of the outer surfaces of the fibers.

4 Claims, 6 Drawing Sheets

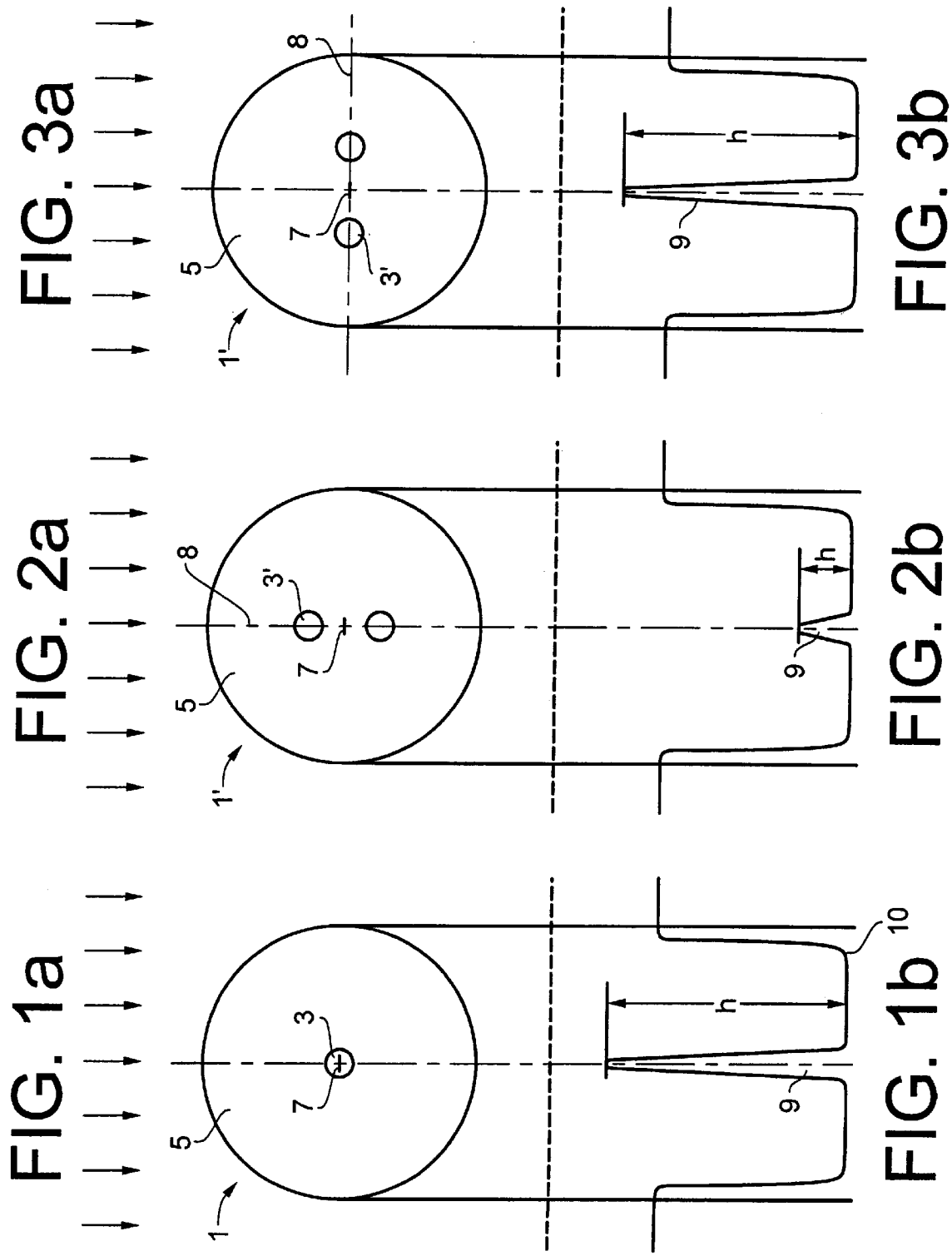

L. MAX +172., MIN +128.
R. MAX +170., MIN +167.

SPLICING AN OPTICAL FIBER HAVING TWIN CORES

The present invention relates to splicing a fiber having twin cores and a standard type fiber having a single core.

BACKGROUND

Standard type optical fibers comprise a cladding having an essentially circular cylindrical outer cladding surface and a thin fiber core, which is located rather centrally inside the cladding and in the ideal case is located along the longitudinal axis of the outer cylindrical surface and thus has the same longitudinal axis as this.

Optical fibers having twin cores, where each core has a shape similar to the core of standard fibers, and the two cores are located essentially symmetrically along a diameter plane of the circular cylindrical cladding, constitute a material used in the research and utilization of many linear and non-linear phenomena, which are based on interaction of the evanescent fields of the fundamental propagational modes of the cores. Such phenomena are used in beam splitters, fiber sensors and non-linear switches.

A major drawback associated with the use of such fibers is however the difficulty both in the excitation and the detection of the signals in the two cores due to their small size and due to the fact that they are located comparatively close to each other. A typical core radius in a fiber having twin cores is approximately 3–4 μm and a typical distance between the two cores is of the magnitude of order of a few radii of the core. It is impossible to obtain a butt joint between an optical fiber having a single core of standard type and a fiber having twin cores and between two fibers having twin cores by means of the conventional splicing methods.

A method, which has been used to overcome this problem, is to use large and powerful optical elements and lenses to focus the incoming light to the cores. Such methods, however, suffer from high losses (7–8 dB) at the introduction of the light, which together with the inconvenience of using larger optical components, for instance due to their unsatisfactory stability during practical use, make them inconvenient for practical use.

In Swedish patent SE-C2 500 874, "Alignment of and splicing optical PM-fibers", which is incorporated by reference herein, it is disclosed how an optical PM fiber can be given a predetermined angular alignment along its longitudinal axis and how this alignment can be used to provide good joints between two optical PM fibers. In the determination the fiber is illuminated with light and the lens effect is then observed, i.e. the light intensity is determined for light passing through the fiber. A light intensity curve perpendicular to the axis of the fiber has then generally a maximum, which corresponds to the core or to the central region of the optical fiber. Outside this maximum there is a region having a lower light intensity, but where the light intensity still can be fairly constant, on said line. Regions outside the outer surface of the fiber obtain a light intensity approximately corresponding to the light intensity without any fiber at all placed in the light beam path. The lens effect is constituted by the contrast between the central region having a high light intensity and the region which is located closest thereto. For an alignment the fiber is rotated, so that the lens effect either becomes maximal or minimal.

In the published International patent application WO-A1 95/14945, "Determination of angular offset between optical fibers having optical, axial asymmetry and alignment and splicing of such fibers", which is also incorporated by reference herein, image analysis is used having a refined evaluation procedure of light intensity curves captured perpendicularly to the longitudinal directions of the fibers in order to for instance splice fibers having twin cores to each other.

SUMMARY

It is an object of the invention to provide a method and a device to join in a simple manner an optical twin-core fiber to a standard optical fiber with an alignment of one core with the core in the standard fiber using a minimum of extra devices to be applied in available automatic fiber splicing machines.

This object is obtained with the invention, the scope and characteristics of which appear from the appended claims.

In joining an optical fiber 1', see the schematic sectional view of FIG. 12, containing twin cores 3' to a corresponding optical fiber 1 of standard type having a single core 3, a core in the twin-core fiber is to be aligned with the core in the conventional fiber, so that light in this core in the twin-core fiber can also propagate in the standard fiber or vice versa. The offsets $\Delta_1$ and $\Delta_2$ between the outer sides of the fibers in the plane, that extends through the two cores 3' in the twin-core fiber, is in this position given by $$\Delta_1 = (d-(D_2-D_1))/2 \text{ and } \Delta_2 = (d+(D_1-D_2))/2$$

where $D_1$ is the outer diameter of the standard fiber, $D_2$ is the outer diameter of the twin-core fiber and d is the distance between the cores in the twin-core fiber. If the fibers are of the same basic type, for instance intended for single-mode-propagation of light of some suitable wave length, they can be assumed to have approximately the same outer diameter, i.e. $D_1=D_2$ and $\Delta_1=\Delta_2=d/2$, i.e. for a good coupling of light in a core in one fiber to a core in the other fiber, the offset in said plane shall be half the distance between the twin fiber cores. This is of course only exactly valid for the ideal case with well circular cylindrical surfaces, symmetrically located twin cores and a centrally located single core.

The distance d between the cores of the twin-core fiber can be determined by making a symmetrical test splice between the fibers and by determining the lateral offset between a core in the twin-core fiber and single core in this splice. Therefore the twin-core fiber must be positioned in such an angular position along its axis, that the plane through the cores in this position obtains a predetermined position. Therefore, capturing of intensity curves according to, for instance the above cited International patent application WO-A1 95/14945 is used, and a determination of the height of the central peak thereof. This height as a function of the rotational angle of the fiber has an extreme value, when the twin-core fiber is located having said plane perpendicular or parallel to a given viewing angle, for instance such as in FIG. 12 with the plane perpendicular to the observation direction. Then the standard fiber is spliced to the twin-core fiber in this position, so that the fiber ends, as seen in this observation direction, are located opposite to each other, having their axes aligned and having their outer sides parallel in the conventional way, what is obtained by only observing the outer sides or outer edges of the fibers as viewed in this observation direction, and then these sides are symmetrically placed in relation to each other, see FIG. 13, so that the offsets $(\Delta_1, \Delta_2)$ between the outer sides of the fibers are equally large and have the same sign. Details of this placement procedure can for instance be taken from the Swedish patent application SE-A 9100978-7, "Splicing optical fibers", filed Apr. 3, 1991, which is incorporated by reference herein.

Practically, a conventional, automatic splicing machine for optical fibers can be used. The twin-core fiber can then be positioned having its cores for instance located in a vertical plane. During the splicing process or from the finished splice the lateral offset of for instance the upper core in the twin-core fiber and the single core is determined. This can be carried out by capturing an image of the fiber splice in a heated state, a warm-fiber image, when the splice is made by means of fusion-welding, as is described in the Swedish patent SE-C 469 200 cited hereinafter.

Thereupon, the splice region, where the fibers are joined to each other, is removed and the fiber ends are spliced to each other again but this time with a suitable, calculated offset of the outer surfaces or sides of the fibers. This offset can then somewhat exceed the earlier determined offset or the offset value, which is calculated according to the above formulas, when the fibers have different diameters, where the exceeding amount is chosen with regard to the lateral movement of the fiber ends in a final welding of the fiber ends to each other. This calculation and welding to each other can then be performed as is disclosed in the Swedish patent application SE-A 9400781-2, cited hereinafter.

BRIEF DESCRIPTION OF THE DRAWINGS

An embodiment of the invention, which is given for the purpose of illustration only but is not intended to limit the invention, will now be described with reference to the accompanying drawings, in which FIG. 1a is schematic view an optical fiber of standard type illuminated by a light source and FIG. 1b is a curve illustrating the light intensity when light has passed through the fiber, FIGS. 2a and 2b are a view and a curve similar to those of FIGS. 1a and 1b for an optical fiber having twin cores for a first orientation of the two cores in relation to the direction of the incident light rays, FIGS. 3a and 3b are a view and a curve similar to those of FIGS. 2a and 2b for a second orientation of the two cores in relation to the direction of the incident light rays.

DETAILED DESCRIPTION

Figure 4:
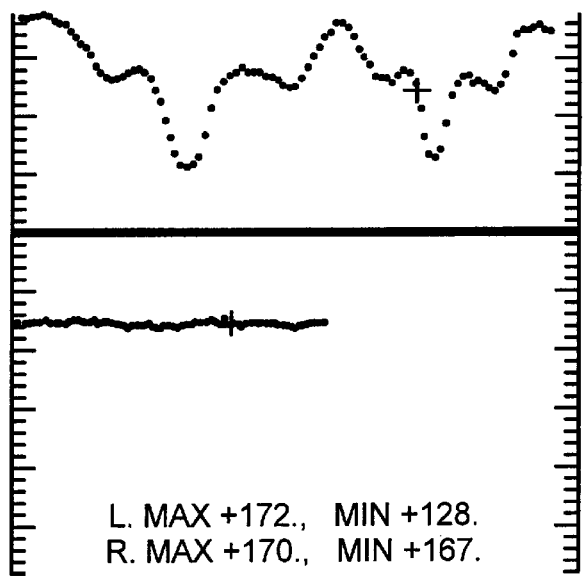
FIG. 4 is a screen image, in which a relative central light intensity is given as a function of the rotation angle for a fiber having a twin core and for a fiber having a single core.
Figure 12:
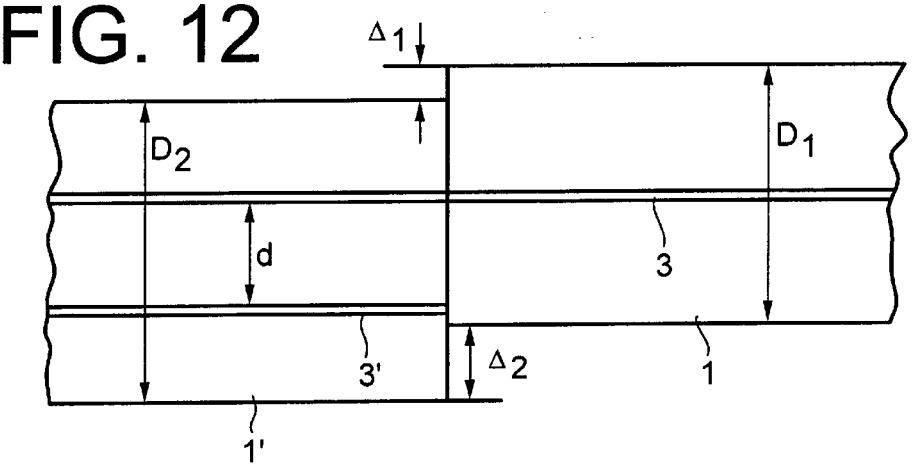
FIGS. 12 and 13 are schematic sectional views of fiber ends located next to each other.
Figure 13:
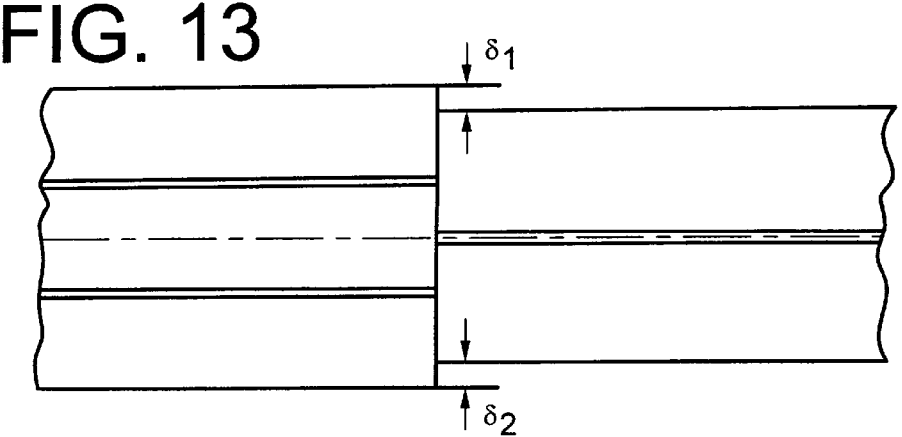

In FIGS. 1a, 2a and 3a the light beam path is schematically shown when a parallel light beam (coming from above as seen in the figures) passes through an optical fiber 1, 1' of standard type having a core 3, and of a type having two cores 3' respectively, where the latter type is rotated to two different orientations around its longitudinal axis 7. The optical fibers 1, 1' have a cladding or cladding 5 having an essentially circular cylindrical outer surface, which encloses the cores 3, 3'. The single core 3 of a standard fiber 1 is located approximately symmetrically inside the cladding 5, i.e. approximately concentrically thereto and consequently in such a manner that the longitudinal axes 7 of the core 3 and the cladding approximately coincide. The cores 3' of the twin-core fiber 1' can normally be assumed to have approximately the same diameter as the core 3 of the standard fibers and they are located at places in relation to the longitudinal axis 7 of the fiber 3', which are located more or less exactly diametrically opposite to each other as seen in the cross section of the fiber, i.e. so that they are located approximately in a plane 8 passing through the longitudinal axis 7 of the fiber 1' and symmetrically in relation to the longitudinal axis 7 of the fiber.

When joining a fiber of standard type having a single core to one of the cores of an optical fiber having twin cores, the end surfaces of the cores of the two fiber ends, which are to be spliced, are to be placed opposite to each other, in order to obtain a maximal transmission of light from one of the fiber cores in one end of the twin-core fiber to the fiber core in the end of the standard fiber.

In FIGS. 1b, 2b and 3b intensity curves of light, which has passed through the fibers 1, 1', are shown, the intensity curves being taken along a direction perpendicular to the incident parallel light beam, and perpendicular to the longitudinal axis 7 of the optical fiber. Further, the curve is captured along a line, which extends approximately through the focal line for the cylindrical lens, which is formed by the cladding 5 of the fiber. For a standard fiber 1 having a single core 3, for instance of single-mode type, a rather high central peak 9, corresponding to the longitudinal axis 7 of the fiber, and next to this peak regions 10 having a relatively constant, low light intensity, are obtained as shown in FIG. 1b. Outside these regions 10, having a low light intensity, there are regions having a constant higher intensity, which is the kind of light, which has travelled past the fiber and is basically unaffected thereof. The transition to these regions then corresponds to the outer sides or surfaces of the fiber, as seen in the incident direction of the light, and the very border or transition to these outer regions can be used for positioning the fiber in a transverse or lateral direction, see below.

In FIG. 2a an orientation of an optical twin-core fiber 1' is shown, in which the fiber cores 3' are located, so that they are both located aligned with and symmetrically in relation to the direction of incident beam. Light rays, which are incident to the cores 3' do not materially contribute to the light intensity, which can be observed on the other side of the fiber, i.e. after the light rays passing through the fiber 1'. Deflections of the light rays occur namely during their travel into and out of these regions and at reflections to the surface of the fiber cores. Since a cylindrical body, as mentioned above, has a focusing effect on incident parallel light rays, what is moreover termed the lens effect of the optical fiber, an increased light intensity at the corresponding focus is obtained, which in the light intensity curve is shown as a central, not very high peak 9, as illustrated in FIG. 2b.

In FIG. 3a the orientation of the optical fiber 1' is instead such, that the two cores 3' are essentially located along a diameter 8 of the optical fiber 1' being perpendicular to the direction of the incident parallel beam. As appears from the figure, in this case some of the outer incident light rays are indeed prevented from passing through the optical fiber due to the interfering effect of the cores 3', but central light rays coming from directions, which are located next to and close to the fiber axis 7, pass therethrough. A corresponding light intensity curve, which to a considerable amount is formed by the central rays and which is shown in FIG. 3b, has a central peak 9, which has a considerably larger height in this case compared to the curve of FIG. 2b.

In a continuous rotation of the optical fiber 1, 1' around its longitudinal axis, for each angular position, a curve of the type, which is shown in FIGS. 1b, 2b and 3b is obtained, and in which the central intensity peak 9 has a varying height h above the adjacent parts of the curve. For the twin-core fiber 1' FIGS. 2b and 3b show two extreme cases of the curve, so that at other rotational positions of the twin-core fiber height values h are obtained, which are in the range between the height values h for the curves illustrated in these figures. In all of these curves this value h, which thus constitutes the difference between the height of the central peak 9 and the directly surrounding portions 10 of the light intensity curve, determined as has been described above, is determined for rotations of the fiber 1, 1' at different angular positions.

This value h is determined for different angular positions of the optical fiber 1, 1', for instance for each tenth degree. Curves of such determined height values h appear from the photograph of FIG. 4 of a screen image, which has been calculated by an automatic splicing device, which will be described hereinafter, and which is shown by the monitor thereof. In the top portion of FIG. 4, the values h for a twin-core fiber at different rotational positions are hence shown by the bright points and in the bottom portion of FIG. 4 the corresponding height values for a fiber having a single core are seen. The values in the bottom portion are rather constant for different rotations, since the fiber in this case is essentially rotationally symmetric, of course having some small deviations from a circular shape and concentric positions, which give the small variations in the values for different rotation angles. The values for a twin-core fiber, however, have large variations for different angular positions, having extreme values corresponding to fiber positions according to FIGS. 2a and 3b. In particular, the values h for the twin-core fiber present also large differences for fibers of different manufacture and design, for instance depending on the distance between the two cores 3', the diameters thereof, refractive index gradients, etc.

Figure 5:
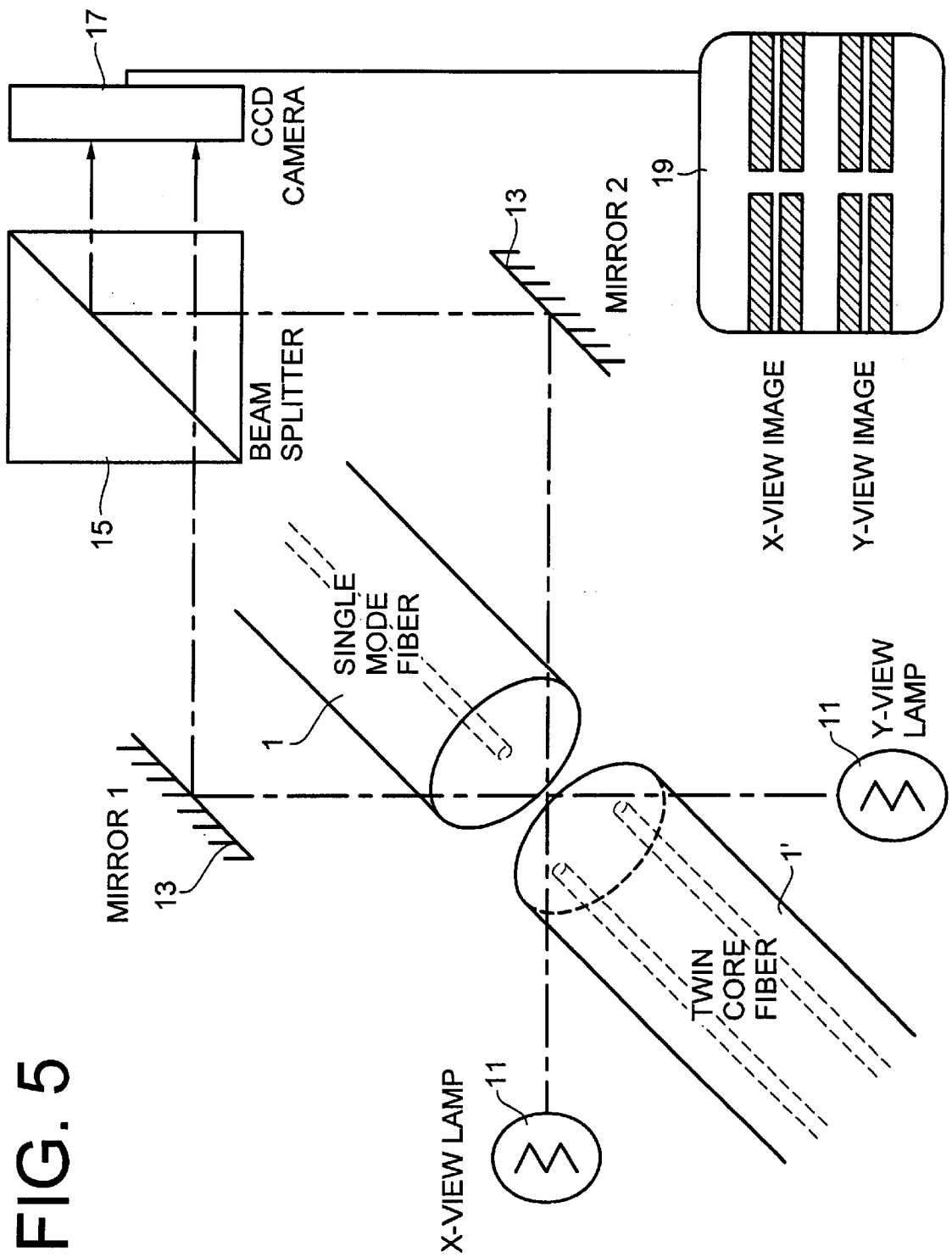
FIG. 5 is a schematic picture illustrating the light beam paths and the electrodes in a device for splicing optical fibers.

Essential optical components in a commercially available splicing device for optical fibers of standard type are shown in FIG. 5 with a standard fiber 1 having a single core and a twin-core fiber 1' mounted in the device. Two light sources 11 are arranged in such a way that they emit light beams, which reach the end regions of the optical fibers 1, 1' under mutually perpendicular directions, the x- and y-direction, respectively. The light beams passing through the fibers are deflected by means of mirrors 13 and are focused to one single parallel beam by means of a beam splitter 15. The single parallel beam obtained in this manner hits the light sensitive elements of a video camera 17 of CCD-type, which is connected to a monitor 19. Lens systems, not shown, can be arranged at different locations of the light beam path in order to obtain sharp reproductions.

Figure 6:
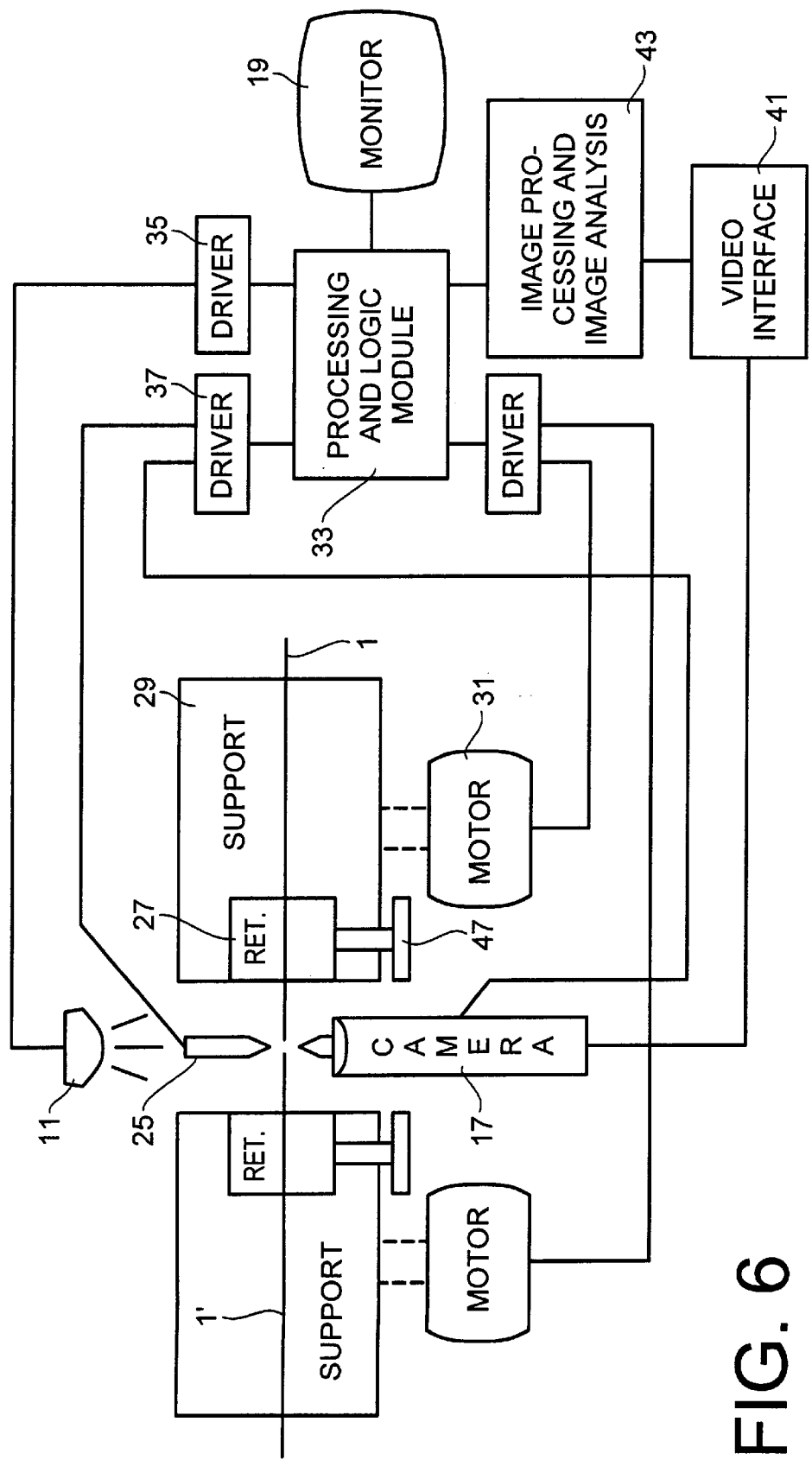
FIG. 6 is a schematic view, partly illustrated as a block diagram, of a device for splicing optical fibers.

The mechanical and electronic components in such a device for splicing two optical fibers are schematically shown in FIG. 6. This device is fundamentally a conventional automatic splicing device for optical fibers supplemented with devices for orientating the fibers angularly and having special routines for analysing the determined light intensity curves.

The two optical fibers 1 and 1', which are to be spliced, are placed with their ends in special retainers 27, by means of which the fibers can be rotated about their longitudinal axes. These retainers 27 are further arranged on conventional alignment supports 29 for the fiber ends of the splicing machine. Further, the fiber supports 29 can be operated in relation to each other, in the same perpendicular directions x and y, which are indicated by the two light beam directions from the lamps 11 in FIG. 4, and also in the longitudinal direction of the fibers by means of drive motors 31, which are controlled by logical circuits and software in a processor logic module 33. The lamps 11 are activated by their own driver circuits 35 of the processor logic 33. Welding electrodes 25, at the points of which the fiber ends are to be placed, are energized by their driver circuits 37 controlled by the processor logic 33. The video camera 17 captures the image of the fiber ends and provides the corresponding video signals through a video interface 41 to an image processing and image analysis module 43. The result of the image processing and the image analysis in this module 43 is sent to the processor logic module 33 and the result can be shown on the monitor 19. Also the directly obtained image of the end region of the fibers captured by means of the video camera 39 can be shown on the monitor 19.

In measurements and a possible splicing of two optical fibers, they are placed having their ends in the rotatable retainers 27, so that the fibers are aligned in parallel with and opposite to each other. By means of the conventional control by means of the processor logic module 33, the two fibers are aligned with each other in the transverse direction in relation to the longitudinal axes of the fibers and their end surfaces are also placed close to each other. An image of the end region of the fibers can then be shown on the monitor 19 and by means of the image processing and image analysis module 43 also curves corresponding to the curves of FIGS. 1b, 2b and 3b are determined for several different straight lines, which are equally spaced from each other and are perpendicular in relation to the longitudinal direction of the fibers on each side of the planned splice.

By operating knobs 47 of the rotatable retainers 27 the rotational angle of the fibers are varied from an initial position, so that curves are captured for equally spaced angular values over a full revolution, for instance as suggested above for each tenth degree. The heights h of light intensity profiles for a certain angular position are determined by an automatic analysis of the curves, the height of their central peaks are determined and the average of several such heights is then calculated. The corresponding numerical values for each fiber end can then be continuously shown on the monitor 19. When the fibers are turned or rotated by means of the operating knob 47 it might still be necessary to adjust the position of the fibers in order for them to be observable and this is performed as before by the automatic alignment control in the processor logic module 33 by energizing the control motors 31 for the retainers 29.

Figure 7:
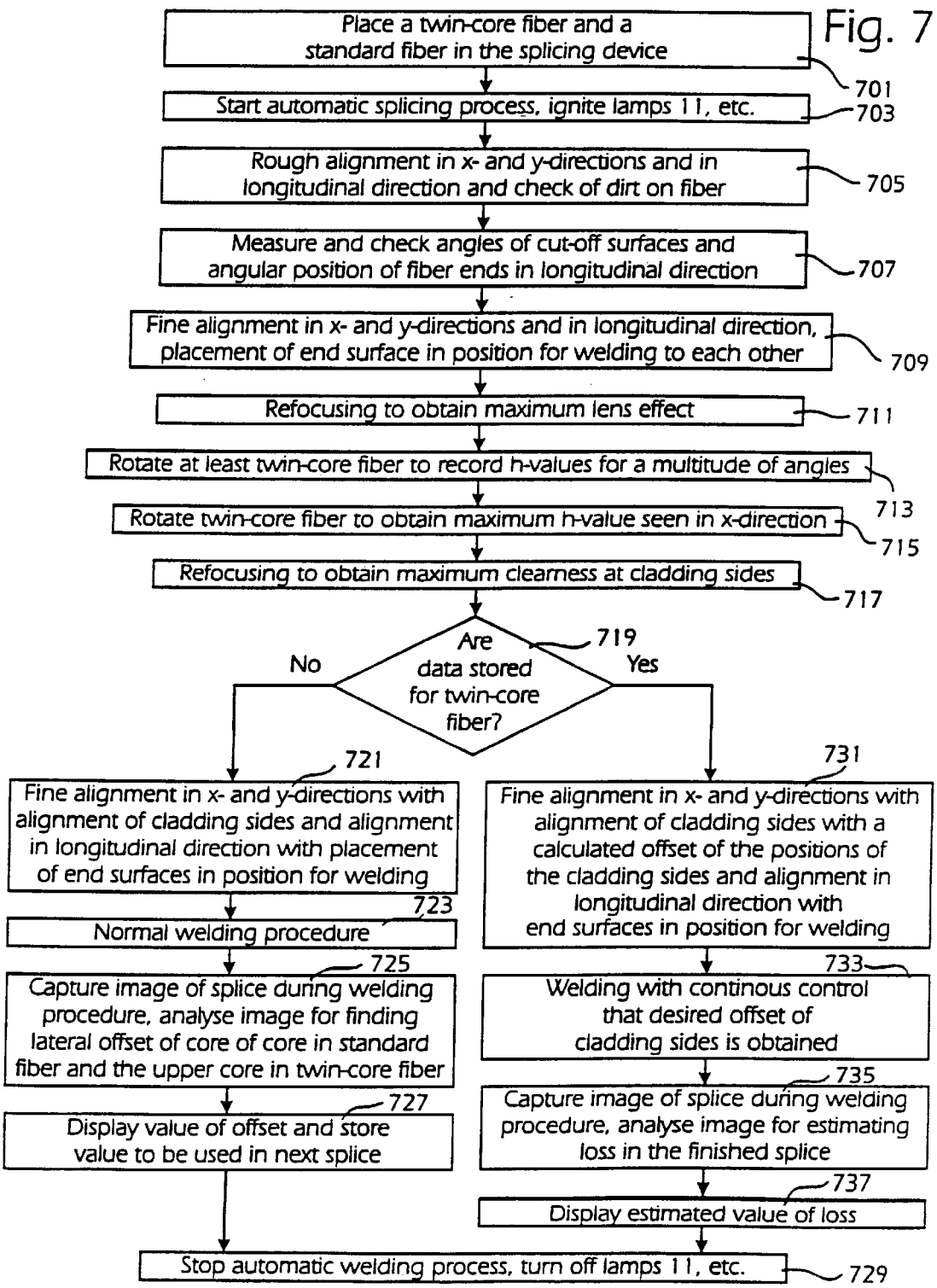
FIG. 7 is a flow chart of different operative steps performed in welding a fiber having a single core to a twin-core fiber.

In FIG. 7 a method is illustrated by means of a block diagram, for splicing a twin-core fiber to an optical fiber of standard type having a single core in which the splicing is performed with an alignment of a core in the twin-core fiber with the core in the standard type fiber, so that the obtained splice in the normal case gets an acceptably low attenuation. The procedure is started in a step 701 by inserting the fiber ends of the optical fibers 1 and 1' respectively into the fiber retainers 27 in the automatic splicing device as described above. The apparatus is then started by operating some suitable operating key or similar device, not shown, so that the execution start of a program which is present in the processor logic part 33. Hereupon for instance first the two lights sources 11 are ignited for emitting light beams in the x- and y-directions. In a step 705 a rough alignment in the transverse directions in relation to the fibers is performed in the conventional manner, i.e. an alignment of the fibers in the x- and y-directions, and further the end surfaces of the fiber ends are brought to a position close to each other, centrally between the points of the electrodes 25. An image is captured in this step and is automatically analyzed by the image processing and image analysis part 43 in order to make certain that the fiber ends are well cleansed and that there are no remaining particles on the outer surfaces of the fiber ends. If particles of dirt should be present, a suitable message can be shown on the monitor and the procedure be stopped until the fiber ends have been cleansed and again been placed in the retainers.

Otherwise the image obtained in this position is analyzed in a step 707 for making certain that the end surfaces are located in a right angle or at least in angles very close to a right angle in relation to the longitudinal direction of the fiber ends. Here it is also checked that the longitudinal directions of the fiber ends, i.e. the outer surfaces of the fiber ends, as appearing on the monitor 19, are located well horizontally in the image, i.e. that they have the position appearing in particular from the screen image on the monitor 19 of FIG. 5. If these different checks should give a negative result, some suitable message is shown on the monitor, whereupon an operator can take proper actions, such as releasing a fiber end and again perform a cutting of the end in order to obtain a cut surface, which is located in a more perpendicular direction.

After this curves of the type, which is shown in FIGS. 1b, 2b, 3b and in FIG. 4, are to be captured, and therefor an accurate transverse alignment of the fiber ends with each other is performed in a step 709—the earlier mentioned transitional locations in the captured image are then used, which represent the positions of the outer surfaces of the fibers—and further the end surfaces of the fiber ends are placed next to each other in a position suitable for welding them to each other, by the method that the processor logic provides suitable signals to the driver circuits for the drive motors 31 during a simultaneous image processing of image analysis of the image captured by the video camera 17. As is conventional, this positioning is performed with a feedback control through a continuous image analysis and feedback of the result of the image analysis to the processor logic 33, which controls the driver circuits 31 for obtaining the accurate alignment. The end surfaces of the fiber ends then become placed exactly centrally between the ends of the electrodes 25. In a step 711 then a refocusing is performed, so that a maximal lens effect is obtained, i.e. as large light intensity as possible in the central longitudinal region. It is made by moving a main lens, not shown, belonging to the video camera 17. After this a step 713, in which at least the end of the twin-core fiber is turned in suitable, equally large steps, for instance of the size 10°, around its longitudinal axes, is performed in order to capture curves of the type illustrated in FIG. 4. Strictly, only curves corresponding to the half of a full turn, i.e. 180°, are required, since the twin-core fiber can be assumed to have a two-fold axial symmetry. For obtaining a better measurement significance, however, preferably curves for a full turn are obtained.

After this in a step 715 the fiber 1' having twin cores is rotated to the position shown in FIGS. 2a and 5, in which the maximal value of the height h is obtained in a light intensity curve as seen in the x-direction and which has been determined by an evaluation of the captured curves for different rotational angles. After this, an alignment is to be performed only with regard to the outer surfaces of the fiber ends, i.e. the outer surfaces of the cladding 5, and therefor the focusing of the obtained image on the video camera 17 is again adjusted in a step 717 by controlling the lens system for the video camera, so that these outer surfaces are sharply reproduced on the light sensitive surface of the video camera 17.

Figure 8:
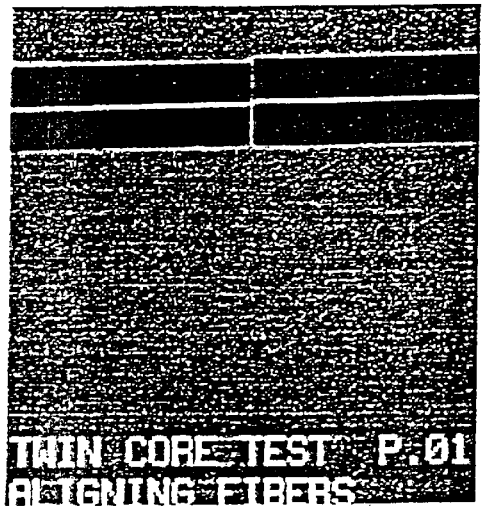
FIG. 8 is a screen image captured before the welding step for determination of a desired offset.
Figure 9:
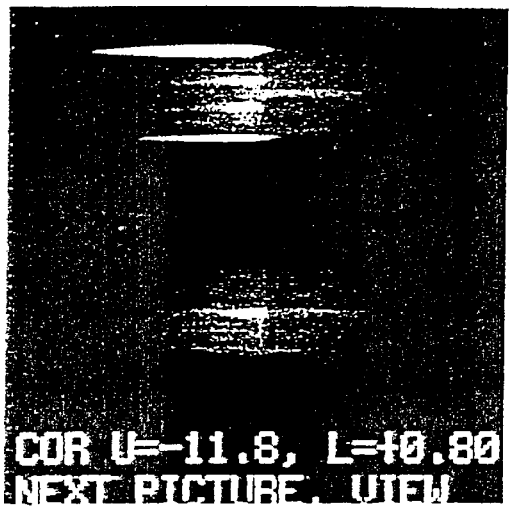
FIG. 9 is a screen image captured during the welding step for determination of a desired offset.

If it is now presumed that the fiber 1' having twin cores is of an unknown or new type, the distance between its two cores 3' must in some way be measured or determined. Thus, in this case there are no such data stored in the processor logic module 33 in the splicing machine. The decision that this case is at hand is made in a block 719, and hence if no such data are stored for the fiber 1' having twin cores, a fine alignment of the outer sides of the claddings of the fiber ends is performed in a step 721, like in the block 709, and also an accurate alignment in the longitudinal direction, so that the end surfaces of the fiber ends are placed in the position for being welding to each other, centrally between the points of the electrodes 35. A screen image captured of this step is shown in FIG. 8.

After this the fibers are welded to each other in a normal manner, as is indicated in a block 723, for instance as is described in the Swedish patent SE-C 469 200, "Method and device for splicing optical fibers and determining the loss/attenuation in a splice of two optical fibers", which is incorporated by reference herein. As also appears from this patent an image can be captured of the joint between the two fibers during the welding process and from this image the lateral offset of the fiber cores in relation to each other in a considered direction appears. This is performed by the image analysis module 43 in a step 725. In a block 727 the value of the lateral offset determined in that way between in this case the upper core in the twin-core fiber 1' and the single core in the standard fiber 1 is stored in a memory in the processor logic part 33 to be used, when a correct splice is to be performed between the same fibers or fiber types. An image captured of the fiber ends in a heated state during the welding process is also stored in a memory and this image together with the calculated numerical value of the offset between the fiber cores are shown on the monitor 19. After this the procedure is terminated in a block 729 and the device, together with lamps, driver circuits, etc. is turned off.

Thus, a standard value of the lateral offset has now been determined between a core in the twin-core fiber 1' and the core in the standard fiber 1, when the claddings are aligned with each other, which value is essentially equivalent to half of the distance between the two cores in the twin-core fiber, since it can be assumed that at the set rotational angle of the twin-core fiber, this fiber is located always in the same position having one core at the top and the other core located vertically below. If the same fiber is now to be spliced in a correct manner with an alignment between the upper fiber core of the twin-core fiber and the core in the standard fiber, the earlier performed splice region and the region of the fiber ends adjacent thereto are to be removed, by cutting the fibers at suitable locations and preparing their ends in the usual manner for splicing.

Then the procedure starts again according to the flow chart in FIG. 7 and the steps 701 to 719 are executed in the same manner as above. In the step 719 one will now instead find that data values are stored for the twin-core fiber and therefore, a block 731 is performed after the block 719 in this case. In this block a transverse fine alignment, in the x- and y-directions is performed, compare the block 721, so that the fiber ends are here placed with a predetermined calculated, suitable offset in relation to each other. This offset then somewhat exceeds the stored offset value. Further, a positioning of the fiber ends in the longitudinal direction is performed, so that their end surfaces are placed close to each other centrally between the points of the electrodes 25. Thereupon in a block 733 welding of the fiber ends to each other is performed with an indirect check that the previously determined offset between the fiber cores, as stored in the block 727, is obtained through a continuous observation of the outer side of the fibers, so that the value of the offset of the outer sides will agree with the stored offset value. The calculation of a suitable initial value for the alignment, the continuous alignment itself, during the heating and welding to each other in the blocks 731 and 733 are advantageously performed in a manner, described in the Swedish patent application SE-A 9400781-2, "Controlled splicing of optical fibers", filed Mar. 8, 1994, which is incorporated by reference herein.

Figure 10:
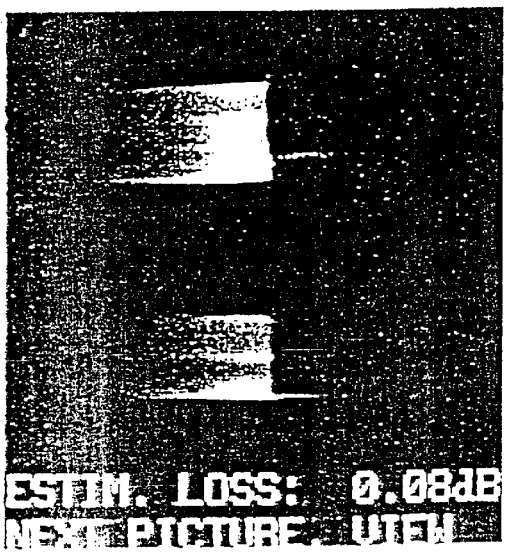
FIG. 10 is a screen image captured during the final welding of fiber ends to each other.
Figure 11:
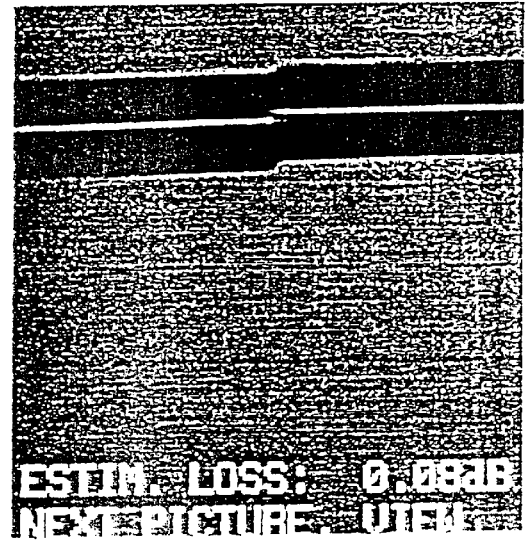
FIG. 11 is a screen image captured after final welding to each other.

Further, like in the block 727, an image is captured of the joint during the very welding process and the image is automatically analyzed by the image processing and image analysis part 43 in order to evaluate the loss in the obtained joint through an evaluation of a possible offset in the image between the upper fiber core and in the core of the standard fiber, as is described in the Swedish patent SE-C 469 200, cited above. An image captured of the fiber ends in a heated state is also stored and is shown on the monitor 19, see the picture of FIG. 10, from which the alignment of the fiber cores appears. In a block 737 the evaluated numerical value of the loss in the fiber splice is then shown on the monitor 19 and also an image of the fiber splice in a cooled state, as is seen in FIG. 11, where the offset of the outer sides of the fiber claddings clearly appears. The bright line in the middle of the fiber ends does not show the fiber cores but corresponds to the central peak 9 of the lens effect, see FIGS. 1b, 2b and 3b. Then the procedure ends and the block 729 is performed as above.

What is claimed:

1. A method of determining the distance between symmetrically placed cores in an optical fiber having twin cores, the method comprising the steps of:

positioning an end of the optical fiber having twin cores to allow images to be captured of the end in a direction substantially perpendicular to a longitudinal axis of the end and substantially perpendicular to a plane through longitudinal axes of the twin cores within the end, providing an optical fiber having a single, centrally located core, splicing the end of the optical fiber having twin cores to an end of the optical fiber having a single core with a symmetrical or concentric positioning of outer sides or surfaces of the ends in relation to each other and with the outer sides or surfaces of the ends parallel to each other, the splicing being performed by heating and welding the ends to each other, capturing in the direction an image of the ends when being heated, the cores of the fibers being visible in the image, determining from the image a value of the offset of one of the twin cores in the fiber having twin cores and the core in the fiber having a single core, and calculating a value equal to twice the determined value of the offset and taking the calculated value as the distance between the cores in the optical fiber having twin cores.

2. The method of claim 1, wherein in the step of positioning the optical fiber having twin cores, further comprising the steps of:

rotating the optical fiber having twin cores about its longitudinal axis, capturing images during the rotating in a direction substantially perpendicular to the longitudinal axis of the end of the optical fiber having twin cores and for a multitude of rotation angles, evaluating the images to find a rotation angle for which a maximum exists in the image captured for this rotation angle of the difference of the light intensity in portions of the image corresponding to the longitudinal axis of the end and portions corresponding to regions in the image located at both sides of the longitudinal axis, and rotating the optical fiber having twin cores to the found rotation angle.

3. A method of joining an optical fiber having twin cores located substantially symmetrically to an optical fiber having a single, substantially symmetrically located core, so that an alignment of one of the twin cores in the optical fiber having twin cores is obtained with the core in the optical fiber having a single core, the method comprising the steps of:

determining the distance between the twin cores of the optical fiber having twin cores, positioning an end of the optical fiber having twin cores with an end surface next to an end surface of an end of the optical fiber having a single core, so that the outer sides or surfaces of the ends are located in parallel, the offset between the outer sides of the fiber ends, as taken in a direction perpendicular to longitudinal directions of the ends and in a plane through the longitudinal axes of the twin cores of the end of the optical fiber having twin cores, has a value, which is determined from the distance between the twin cores in the optical fiber having twin cores and from a difference between the outer diameters of the optical fibers, and joining, after positioning, the ends to each other, wherein the step of determining the distance further comprises the steps of:

positioning an end of the optical fiber having twin cores to allow images to be captured of the end in a direction substantially perpendicular to the longitudinal axis of the end and substantially perpendicular to the plane through the longitudinal axes of the twin cores within the end, providing a test optical fiber having a single, centrally located core, splicing the end of the optical fiber having twin cores to an end of the test optical fiber having a single core with a symmetrical or concentric positioning of outer sides or surfaces of the ends in relation to each other and with the outer sides or surfaces of the ends parallel to each other, the splicing being performed by heating and welding the ends to each other, capturing in the direction an image of the ends when being heated, the cores of the fibers being visible in the image, determining from the image a value of the offset of one of the twin cores in the fiber having twin cores and the core in the fiber having a single core, and calculating a value equal to twice the determined value of the offset and taking the calculated value to be the distance between the twin cores in the optical fiber having twin cores.

4. The method of claim 3, wherein in the step of positioning the optical fiber having twin cores, further comprises the step of:

rotating the optical fiber having twin cores about its longitudinal axis, capturing images during the rotating in a direction substantially perpendicular to the longitudinal axis of the end of the optical fiber having twin cores and for a multitude of rotation angles, evaluating the images to find a rotation angle for which a maximum exists in the image captured for this rotation angle of the difference of the light intensity in portions of the image corresponding to the longitudinal axis of the end and portions corresponding to regions in the image located at both sides of the longitudinal axis, and rotating the optical fiber having twin cores to the found rotation angle.

* * * * *